(No Model.)
W. A. W. EAGER.
VELOCIPEDE.
No. 479,792. Patented Aug. 2, 1892.
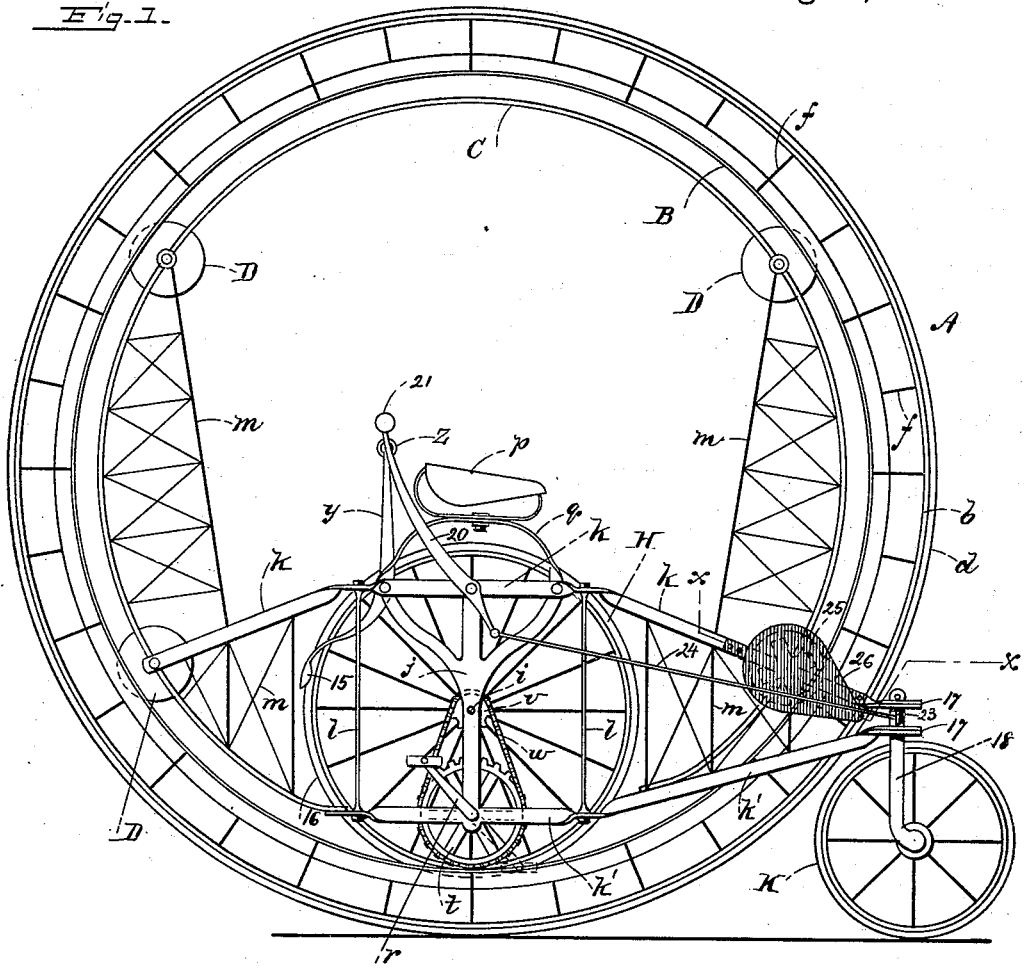
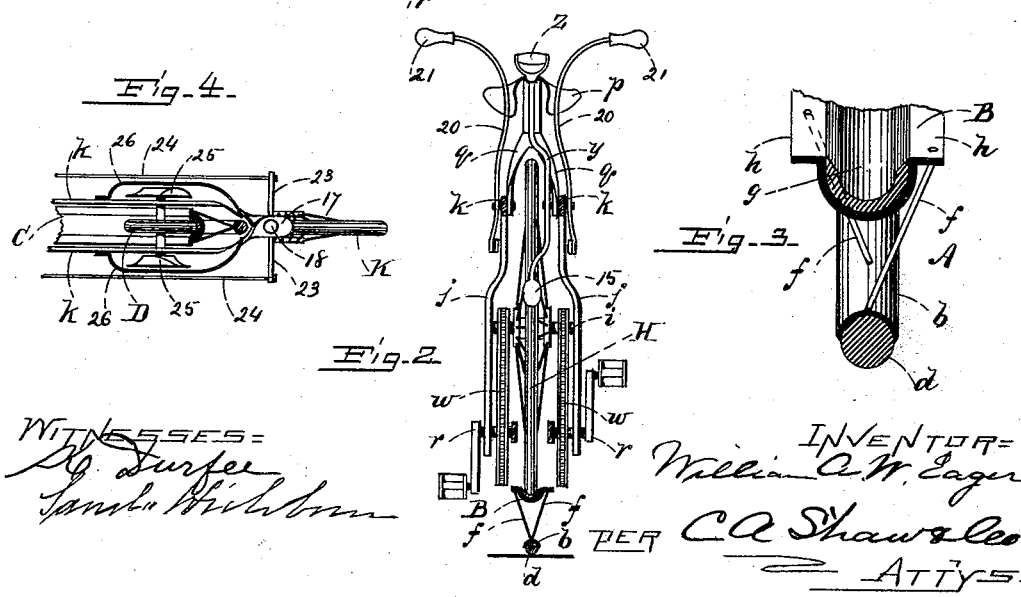

UNITED STATES PATENT OFFICE.

WILLIAM A. W. EAGER, OF WEST GARDNER, MASSACHUSETTS.

VELOCIPEDE.

SPECIFICATION forming part of Letters Patent No. 479,792, dated August 2, 1892.

Application filed September 18, 1891. Serial No. 406,066. (No model.)

*To all whom it may concern:*

Be it known that I, WILLIAM A. W. EAGER, of West Gardner, in the county of Worcester, State of Massachusetts, have invented certain new and useful Improvements in Velocipedes, of which the following is a description sufficiently full, clear, and exact to enable any person skilled in the art or science to which said invention appertains to make and use the same, reference being had to the accompanying drawings, forming part of this specification, in which—

Figure 1 is a side elevation of my improved device; Fig. 2, a front elevation of the same, the rim being shown in cross-section; Fig. 3, a vertical transverse section of the rim, and Fig. 4 a section taken on line $x\ x$ in Fig. 1.

Like letters and figures of reference indicate corresponding parts in the different figures of the drawings.

My invention relates especially to that class of vehicles known as "velocipedes;" and it consists in certain novel features hereinafter fully set forth and claimed, the object being to produce a simpler, cheaper, and more effective device of this character than is now in ordinary use.

The nature and operation of the improvement will be readily understood by all conversant with such matters from the following explanation:

In the drawings, A represents the main felly or outer rim of the velocipede, comprising a semi-tubular hoop $b$, preferably about seven feet in diameter. Said hoop is adapted to receive an elastic tire $d$ in the ordinary manner of bicycle-fellies. From the hoop $b$ spokes $f$ project inwardly, said spokes being preferably six inches in length.

To the inner ends of the spoke a hoop-shaped grooved rim or track B is secured, said track being approximately U-shaped in cross-section, as shown in Fig. 3, and provided with a rubber or similar frictional lining $g$. Spokes $f$ are secured in laterally-projecting flanges $h$ of said track.

An approximately circular frame C, slightly less in diameter than the track B, is provided at intervals with trundle or guide wheels D, which run on the lining $g$ in the groove of said track. In said frame C, directly over the tread of the rim A, there is mounted an ordinary bicycle driving-wheel H, which runs in the track B. The shaft $i$ of said wheel H is mounted in two vertically-arranged parallel frame-bars $j$, connected with the frame C by tie-rods $k\ k'\ l$. Brace or truss rods $m$, in any desired number or position, may be employed in the framework C. Vertically over the axle $i$ a spring-supported bicycle saddle or seat $p$, of ordinary construction, is mounted on supports $q$, secured to the rods $k$. In the lower ends of the uprights $j$ ordinary pedal-cranks $r$ are journaled, the inner ends of the crank-shafts being provided with a sprocket-wheel $t$. On each end of the axle $i$ a sprocket-wheel $v$ is mounted, preferably about one-third of the diameter of the wheel $t$, and each set of sprockets $v\ t$ are connected by a jack-chain $w$. A brake-lever $y$ is pivoted to the vertical end of one of the uprights $j$ and has a handle $g$ projecting in front of the saddle $p$ and a shoe 15 in position to engage the tire 16 of the driving-wheel H.

The frame-bars $k\ k'$ are extended rearwardly beyond the periphery of the rim A and connected by cross-bars 17, in which a vertically-arranged forked rod 18 is fitted to rotate. In the arms of said rod 18 a guide-wheel K is journaled in the same vertical plane as the rim A. On each bar $k\ k'$ a steering-lever 20 is pivoted, each lever being provided with a handle 21, disposed in front of the saddle $p$. Laterally from each side of the bar 18 an arm 23 projects and a rod 24 extends from said arm, respectively, to the lower end of the levers 20. One of the wheels D is journaled between the rear arms $k$ and carries on each end of its axle a rotary fan 25. (See Fig. 4.) A shield 26, secured to the arms $k$, incloses each fan 25, said shield opening onto the outer rim $b$.

In the use of my improvement the saddle $p$ is mounted in the ordinary manner, power being applied to the drive-wheel H by means of the pedal-cranks $r$. Said wheel tends to travel in the grooved track B of the rim A, and as soon as said wheel passes the vertical diametrical line of said rim the weight of the rider and wheel causes said rim to move or rotate in like direction. As the drive-wheel H increases its speed the velocity of the outer rim A is correspondingly increased. Guide-wheels D, mounted in the frame C and affording bearing-points on all portions of the track B, maintain the driving-wheel in an upright position.

By means of the levers 20, the handles 21 of which serve the purpose of the ordinary handle-bars of a bicycle, the device may readily be guided by the wheel K.

The rim A being ordinarily driven at a high rate of speed, dust or refuse from the street would be carried upward thereby and thrown onto the rider. To prevent this I supply the fans 25, which force a rapid current of air against the wheel at a point below its horizontal diameter and serve to free the same of such collections.

Having thus explained my invention, what I claim is—

1. In a velocipede, the combination of a circular rim provided with an annular track on its inner face, a frame traveling in said track, a driving-wheel mounted on said frame directly over the tread of the rim, a shaft mounted on the frame, sprocket-wheels mounted on said shaft and frame, a sprocket-chain on said wheels, a seat mounted above the shaft over the tread of the wheel, a guide-wheel outside said rim, rods $k$ and $k'$, connecting said wheel with the frame, handle-rods pivoted to the frame, a horizontal arm attached to the rod of the guide-wheel, rods 24, connecting the handle-bars with the horizontal arm, a fan mounted in the frame between the connecting-rods $k$, and a shield inclosing said fan, substantially as described.

2. In a velocipede, a rim A, provided with a track B, in combination with a frame C, provided with wheels D, working in said track, and a fan-blower actuated by one of the said wheels for directing an air-current onto said rim.

WILLIAM A. W. EAGER.

Witnesses:
 EDGAR V. REYNOLDS,
 ASA TEMPLE.